(12) United States Patent
Taniguchi (10) Patent No.: US 7,738,436 B2
(45) Date of Patent: Jun. 15, 2010

(54) WIRELESS COMMUNICATION SYSTEM, WIRELESS COMMUNICATION CONTROL APPARATUS, WIRELESS COMMUNICATION APPARATUS AND WIRELESS COMMUNICATION METHOD

(75) Inventor: Masaru Taniguchi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 626 days.

(21) Appl. No.: 11/663,221

(22) PCT Filed: Sep. 16, 2005

(86) PCT No.: PCT/JP2005/017559

§ 371 (c)(1),
(2), (4) Date: Mar. 20, 2007

(87) PCT Pub. No.: WO2006/033424

PCT Pub. Date: Mar. 30, 2006

(65) Prior Publication Data

US 2008/0043678 A1 Feb. 21, 2008

(30) Foreign Application Priority Data

Sep. 21, 2004 (JP) .............................. 2004-273885

(51) Int. Cl.
*H04W 4/00* (2009.01)

(52) U.S. Cl. ...................... 370/340; 370/341; 370/350; 370/335; 455/450; 455/502; 455/509

(58) Field of Classification Search ................. 370/329, 370/340, 341; 455/450–452.2, 507, 511, 455/515, 574, 502, 509
See application file for complete search history.

(56) References Cited

U.S. PATENT DOCUMENTS 5,177,739 A * 1/1993 Basnuevo et al. ........... 370/449

(Continued)

FOREIGN PATENT DOCUMENTS

EP 0 893 013 11/2003

(Continued)

OTHER PUBLICATIONS

International Search Report for PCT/JP2005/017559 dated Aug. 15, 2006.

(Continued)

*Primary Examiner*—Sharad Rampuria
(74) *Attorney, Agent, or Firm*—Eric J. Robinson; Robinson Intellectual Property Law Office, P.C.

(57) ABSTRACT

Information, which has a frame structure and is to be transmitted from a line control apparatus (101) through a control channel to a mobile transmitting/receiving apparatus (102), includes function channel identifying information indicative of the type of information transmitted in an area of control information. When no message is existent which must be notified to the mobile transmitting/receiving apparatus (102), the line control apparatus (101) establishes an idle message in the area of control information and also establishes the function channel identifying information, which is in the same frame, as idle identifying information. If the function channel identifying information is the idle identifying information, the mobile transmitting/receiving apparatus (102) switches a receiving operation in the area of control information into a reception stop operation. Otherwise, the mobile transmitting/receiving apparatus (102) continues the receiving operation in the area of control information. The present invention can start a call in a short time and elongate the operational time with a wireless communication apparatus serving as a mobile wireless station.

13 Claims, 6 Drawing Sheets

U.S. PATENT DOCUMENTS

| | | | | |
|---|---|---|---|---|
| 5,511,067 A | * | 4/1996 | Miller | 370/335 |
| 5,548,834 A | * | 8/1996 | Suard et al. | 455/276.1 |
| 5,687,194 A | * | 11/1997 | Paneth et al. | 375/283 |
| 5,818,825 A | * | 10/1998 | Corrigan et al. | 370/329 |
| 5,850,392 A | | 12/1998 | Wang et al. | |
| 5,991,308 A | * | 11/1999 | Fuhrmann et al. | 370/395.53 |
| 5,995,807 A | * | 11/1999 | Magnier et al. | 455/67.16 |
| 6,016,430 A | * | 1/2000 | Shinomiya | 455/515 |
| 6,144,653 A | * | 11/2000 | Persson et al. | 370/337 |
| 6,327,469 B1 | * | 12/2001 | Gaastra | 455/436 |
| 6,356,555 B1 | * | 3/2002 | Rakib et al. | 370/441 |
| 6,711,403 B1 | * | 3/2004 | Herrmann et al. | 455/422.1 |
| 7,158,795 B2 | * | 1/2007 | Zhang et al. | 455/452.2 |
| 7,324,495 B1 | * | 1/2008 | Gibbons et al. | 370/343 |
| 2003/0156594 A1 | * | 8/2003 | Trott et al. | 370/442 |
| 2006/0045035 A1 | * | 3/2006 | Liu | 370/311 |

FOREIGN PATENT DOCUMENTS

| | | |
|---|---|---|
| JP | 01-245728 | 9/1989 |
| JP | 2000-503831 | 3/2000 |
| JP | 2001-197548 | 7/2001 |
| JP | 2003-101476 | 4/2003 |
| WO | WO 97/38501 | 10/1997 |
| WO | WO 01/33248 | 5/2001 |

OTHER PUBLICATIONS

International Search Report for PCT/JP2005/017559 dated Nov. 29, 2005.

International Preliminary Examination Report (Application No. PCT/JP2005/017559) dated Jun. 28, 2007.

Office Action (Japanese Patent Application No. 2004-273885) mailed Jul. 7, 2009.

* cited by examiner

WIRELESS COMMUNICATION SYSTEM, WIRELESS COMMUNICATION CONTROL APPARATUS, WIRELESS COMMUNICATION APPARATUS AND WIRELESS COMMUNICATION METHOD

TECHNICAL FIELD

The present invention relates to a wireless communication system, a wireless communication control apparatus, a wireless communication apparatus and a wireless communication method.

BACKGROUND ART

A mobile wireless communication scheme is known that assigns one of wireless transmitting/receiving device(s) located on a wireless base station to a call-in or call-out request by a mobile wireless device (see Japanese Patent Application Laid-Open No. 63-180231, for example).

A trunked radio communication system, in which usability of frequency has been improved by sharing a pre-determined number of wireless channels among a plurality of mobile wireless stations using line control apparatuses, is used as a land mobile radio (LMR) system typically for industrial use. In the trunked radio communication system, the wireless base stations located in various places have the line control apparatuses and make the pre-determined number of wireless channels to be sharable among the plurality of mobile wireless stations by transmitting control information to the mobile wireless stations. In this way, by sharing the pre-determined number of wireless channels among the plurality of mobile wireless stations, usability of frequency can be improved compared to a wireless communication system in which each mobile wireless station exclusively uses a dedicated wireless channel.

Generally, in the trunked radio communication system, a single wireless base station manages a plurality of wireless channels, and uses one of the wireless channels as a channel for control (control channel) while it uses the other wireless channels as channels for call (call channels). A mobile wireless station supervises objects received on the control channel, thereby identifies, for example, calling messages sent from the wireless base station on the control channel. If there is calling to the mobile wireless station itself, the station switches to the designated call channel to perform an operation to start a call to, for example, an origin mobile wireless station which made the calling.

More specifically, in North America, while various types of trunked radio communication systems are used, many radio devices on the LTR (Logic Trunked Radio) system are used for simple and low-cost systems. On the other hand, in Japan, the ARIB-T61 system (hereinafter, also referred to as "ARIB" system) is defined as a standard specification.

In a radio communication system on the LTR system, a wireless channel comprises functions applicable for both of control and call, so that a dedicated control channel is not provided. While a wireless channel is not used, the wireless channel is in an idle state due to no transmission on the channel. As soon as a calling mobile wireless station knows that radio wave is not outputted on some of wireless channel bands, it performs processing to transmit a call request message. On the other hand, another mobile wireless station in a wait state cannot predict when a calling message will be sent, so it always stays in a receive state even while no transmission is performed on a wireless channel managed by a wireless base station. When the mobile wireless station receives a calling message from the wireless base station, it extracts identifying information (ID information) in the calling message. If and only if the information matches the identifying information of the mobile wireless station itself, the station switches to the call channel to start a call with the origin mobile wireless station. As above, while the LTR system has an advantage that a link is established between mobile wireless stations as soon as calling is made, it has also a problem that a mobile wireless station in a wait state must always perform a receiving operation.

Further, in a wireless communication system on the ARIB system, for example, one of a plurality of wireless channels managed by a wireless base station is used as a dedicated control channel and is in a transmission state continuously to continue sending control information. The control information sent from the wireless base station on the control channel includes various types of messages including broadcast (notifying) information or calling information. In a wireless communication system on the ARIB system, control information sent on such a control channel has a super frame structure consisting of a plurality of frames so that it is possible to designate which frame in the super frames includes what control information. In this situation, information about the super frame structure is included in broadcast (notifying) information in the control information, so that the mobile wireless station can identify, by receiving the broadcast (notifying) information, in which frame it is called. In frames other than the identified one, for example calling to other mobile wireless stations is made, the mobile wireless stations receive the identified frames only, while it can stop the receiving operation in the other frames.

As described above, in a wireless communication system on the ARIB system, the control information has the super frame structure so that a mobile wireless station can perform intermittent reception. This has an advantage that the operational time can be elongated compared to the case that the receiving operation must be performed continuously. However, since a frame for calling is fixed, the longer the super frame becomes, the longer it takes to establish a link between the mobile wireless stations. Since such a land mobile wireless system provide for, in addition to separate calling to call each mobile wireless station separately, group calling to call a plurality of mobile wireless stations as a group at one time, the mobile wireless station has a function to wait for a plurality of groups simultaneously. This leads to a problem in which it is necessary to check a plurality of frames even in the case of the super frame structure, reducing the advantage of elongating the operational time using the super frame structure.

In a general land mobile wireless system, a user starts a call by switching on (for example, pushing) a PTT (Push-To-Talk) switch. In this system, it is preferred that a time period is as short as possible between the pushing of the PTT switch and start of the call after the completion of the calling process. On the contrary, in a portable mobile wireless station using a battery as power supply, it is preferred to elongate the operational time by reducing consumption current as much as possible, since the consumption current in a wait state shorten the battery life.

The present invention is made in view of the above situation and its object is to provide a wireless communication system, a wireless communication control apparatus, a wireless communication apparatus and a wireless communication method which can start a call in a short time and elongate the operational time.

DISCLOSURE OF THE INVENTION

A wireless communication system according to a first aspect of the present invention to achieve the above object is a wireless communication system for performing wireless communication using a control channel and a plurality of call channels which can be assigned to some of a plurality of wireless communication apparatuses specified by information transmitted on said control channel, comprising a channel control apparatus which transmits frame structured information having at least three areas of a synchronizing word, channel identifying information and control information to at least one of said plurality of wireless communication apparatuses on the single control channel. In this system, said channel control apparatus is configured to operate to transmit the function channel identifying information, which indicates of the type of information transmitted in the area of control information, in the area of channel identifying information included in said frame structured information. Further, each of said plurality of wireless communication apparatuses is configured to operate to establish a receiving operation in the area of control information as one of a plurality of types of operations including a reception stop operation by determining the type of the function channel identifying information included in said frame structured information when the apparatus receives said frame structured information on the control channel.

Said channel control apparatus can operate, if the information transmitted in the area of control information is an idle message differing from a broadcast (notification) message and a calling message, to transmit the idle identifying information to specifiably indicate the idle message as the function channel identifying information. Each of said plurality of wireless communication apparatuses can operate, if the received function channel identifying information is determined to be the idle identifying information, to switch the receiving operation in the area of control information in the same frame as the function channel identifying information into the reception stop operation.

Said channel control apparatus can operate to transmit the idle identifying information as the function channel identifying information if the information transmitted in the area of control information is a message that should be received voluntarily by the wireless communication apparatus. Each of said plurality of wireless communication apparatuses can operate to establish the receiving operation in the area of control information as either of an operation to continue receiving the information or the reception stop operation depending on its own operation state if the received function channel identifying information is determined to be the idle identifying information.

Said channel control apparatus can operate to include random access control information indicative of permission or prohibition of random access transmission in said frame structured information and transmit it in an area next to the area of control information; and each of said plurality of wireless communication apparatuses can operate to switch to a reception resume operation to resume receiving in the area of random access control information when it switches the receiving operation in the area of control information into the reception stop operation.

A wireless communication control apparatus according to a second aspect of the present invention is a wireless communication control apparatus which controls wireless communication using a control channel and a plurality of communication channels which can be assigned to some of a plurality of wireless communication apparatuses specified by information transmitted on said control channel, comprising:

channel controlling means for transmitting frame structured information, which has at least three areas of a synchronizing word, channel identifying information and control information, to at least one of said plurality of wireless communication apparatuses on the single control channel; wherein said channel controlling means is configured to operate to transmit function channel identifying information, which is indicative of the type of information transmitted in the area of control information, in the area of function channel identifying information included in the channel identifying information of said frame structured information.

Said channel controlling means can operate, if the information transmitted in the area of control information is an idle message differing from a broadcast (notification) message and a calling message, to transmit idle identifying information to specifiably indicate the idle message as the function channel identifying information.

Said channel control means can operate, if the information transmitted in the area of control information is a message that should be received voluntarily by the wireless communication apparatus, to transmit identifying information to indicate any reception as the function channel identifying information.

A wireless communication apparatus according to a third aspect of the present invention is a wireless communication apparatus for performing wireless communication using a control channel and a communication channel assigned by information transmitted on said control channel, comprising: control channel transmission information receiving means for receiving information, which is frame structured information having at least three areas of a synchronizing word, channel identifying information and control information, from a wireless base station on the single control channel, wherein function channel identifying information, which indicates the type of information transmitted in the area of control information, is transmitted in the area of channel identifying information; and operation controlling means for establishing a receiving operation in the area of control information as one of multiple types of operations including a reception stop operation by determining the type of function channel identifying information included in said frame structured information received by said control channel transmission information receiving means.

Said operation controlling means can operate, if the function channel identifying information received by said control channel transmission information receiving means is determined to be idle identifying information to specifiably indicate an idle message differing from a broadcast (notification) message and a calling message as the information transmitted in the area of control information, to switch the receiving operation in the area of control information in the same frame as the function channel identifying information into the reception stop operation.

Said operation controlling means can operate to: if the function channel identifying information received by said control channel transmission information receiving means is determined to be identifying information to specifiably indicate a broadcast (notification) message or a calling message as the information transmitted in the area of control information, establish the receiving operation in the area of control information in the same frame as the function channel identifying information as an operation to continue receiving the information; and if function channel identifying information received by said control channel transmission information receiving means is determined to be the idle identifying information to specifiably indicate an idle message differing from a broadcast (notification) message and a calling message as information transmitted in the area of control information, establish the receiving operation in the area of control information in the same frame as the function channel identifying information as either of an operation to continue receiving the information or a reception stop operation, depending on its own operation state.

A wireless communication method according to a fourth aspect of the present invention is a wireless communication method for performing wireless communication using a control channel and a plurality of communication channels which can be assigned to some of a plurality of wireless communication apparatuses specified by information transmitted on said control channel, including a series of steps of: transmitting frame structured information having at least three areas of a synchronizing word, channel identifying information and control information from a wireless base station to at least one of said plurality of wireless communication apparatuses on the single control channel; transmitting function channel identifying information, which indicates the type of information transmitted in the area of control information, in the area of function channel identifying information included in said frame structured information; and when each of said plurality of wireless communication apparatuses receives said frame structured information on the control-channel, establishing a receiving operation in the area of control information as one of multiple types of operations including a reception stop operation by determining the type of the function channel identifying information included in said frame structured information.

In this method, the processing can be arranged, if the information transmitted in the area of control information is an idle message differing from a broadcast (notification) message and a calling message, to transmit idle identifying information to specifiably indicate the idle message as the function channel identifying information from said wireless base station; and if each of said plurality of wireless communication apparatuses determines that the received function channel identifying information is the idle identifying information, to switch the receiving operation in the area of control information in the same frame as the function channel identifying information into the reception stop operation.

The method can also includes: if the information transmitted in the area of control information is a message which should be received voluntarily by the wireless communication apparatus, transmitting the idle identifying information as the function channel identifying information from said wireless base station; and if each of said plurality of wireless communication apparatuses determines that the received function channel identifying information is the idle identifying information, establishing the receiving operation in the area of control information as either of an operation to continue receiving the information or the reception stop operation, depending on its own operation state.

The method can further includes: including random access control information indicative of permission or prohibition of random access transmission in said frame structured information and transmitting the information in an area next to the area of control information; and when each of said plurality of wireless communication apparatuses switches the receiving operation in the area of control information into the reception stop operation, switching a reception resume operation to resume receiving in the area of random access control information.

BEST MODE FOR CARRYING OUT THE INVENTION

According to the present invention, a wireless communication apparatus serving as a mobile wireless station can start a call in a short time and elongate the operational time due to the increased frequency of the intermittent reception.

Figure 1:
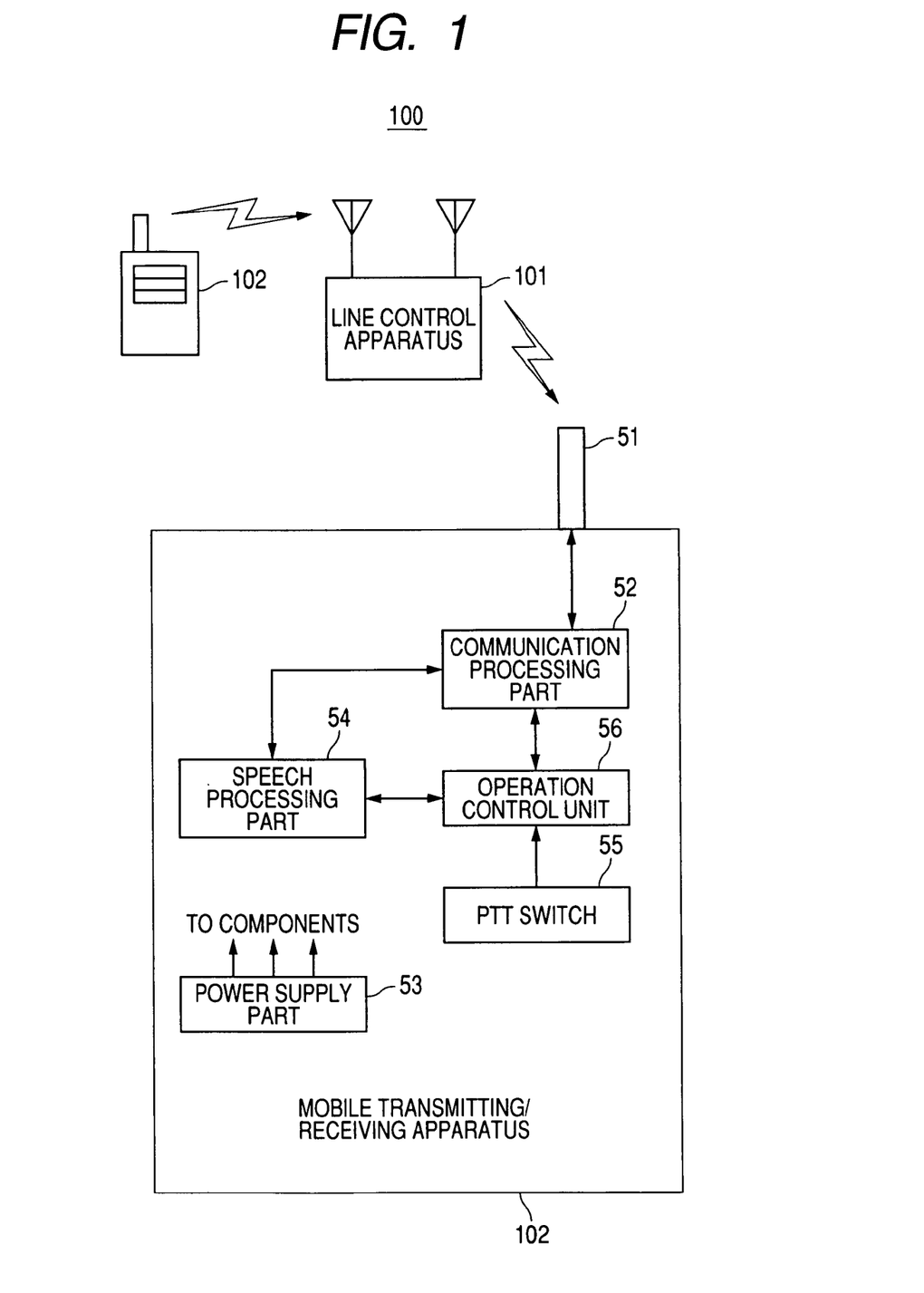
FIG. 1 shows one configurational example of a wireless communication system according to embodiments of the present invention.

In the following, a wireless communication system 100 according to embodiments of the present invention is described in detail by referencing the drawings. The wireless communication system 100 includes, for example as shown in FIG. 1, a line control apparatus 101 located in at least one (generally, a plurality of) wireless base station(s) and at least one (generally, a plurality of) mobile transmitting/receiving apparatus(s) 102 serving as a mobile wireless station. FIG. 1 illustrates one line control apparatus 101 and two mobile transmitting/receiving apparatuses 102 as an example. The wireless communication system 100 can be preferably a trunked radio communication system in which the plurality of mobile transmitting/receiving apparatuses 102 perform wireless communication by sharing a pre-determined number of wireless channels and transmitting/receiving a Radio Frequency (RF) signal to/from the wireless base stations. Each mobile transmitting/receiving apparatus 102 enables a voice call (conversation) with other mobile transmitting/receiving apparatuses 102 or other communication terminals connected to the line control apparatus 101 via an RF link or the line control apparatus 101.

The line control apparatus 101, which manages a plurality of wireless channels divided into and deployed on a plurality of frequency bands, comprises a function as a wireless communication channel control apparatus to control the assignment of wireless channels to each mobile transmitting/receiving apparatus 102. That is, the line control apparatus 101 can provide wireless communication services such as a voice call for each mobile transmitting/receiving apparatus 102 by controlling wireless communication using a plurality of wireless channels as control channels and a plurality of call channels which can be assigned to some of the mobile transmitting/receiving apparatuses 102 specified by information transmitted on said control channel.

Figure 2A:
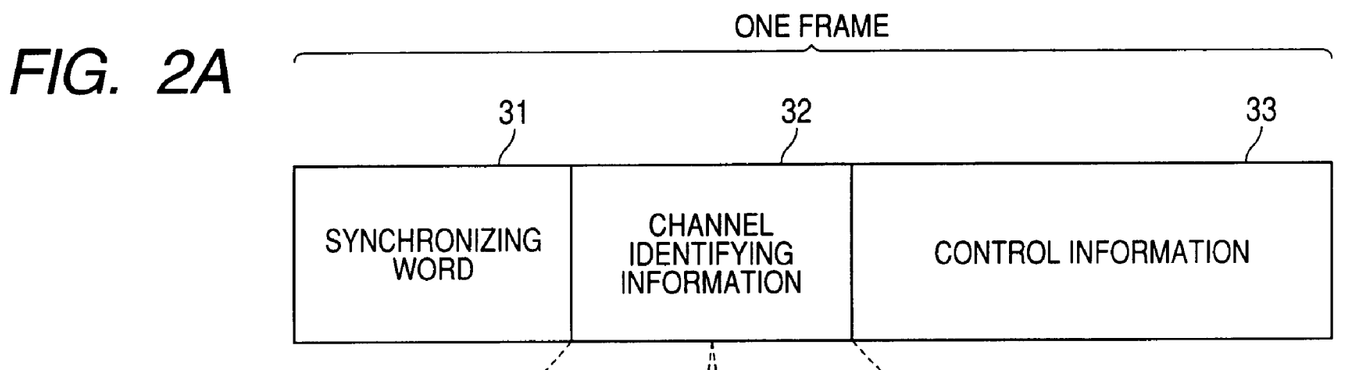
FIG. 2 illustrates a frame structure of information transmitted by a line control apparatus.

In this embodiment, the line control apparatus 101 transmits information having a frame structure as shown in FIGS. 2(A) and (B) to each mobile transmitting/receiving apparatus 102 on the control channel. As shown in FIG. 2(A), the information transmitted from the line control apparatus 101 on the control channel includes an area of a synchronizing word 31, an area of channel identifying information 32 and an area of control information 33.

Figure 2B:
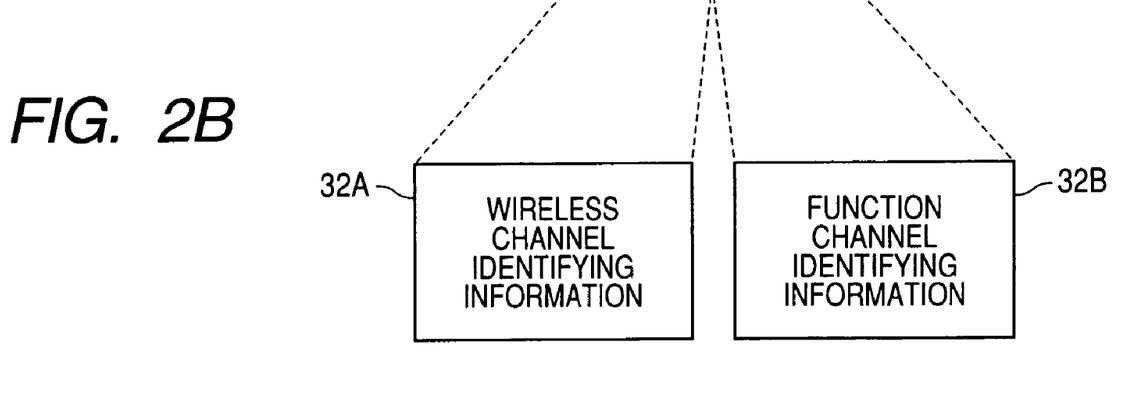

The synchronizing word 31, which is used for synchronization processing to establish synchronization in wireless communication between the line control apparatus 101 and each mobile transmitting/receiving apparatus 102, has a predetermined code pattern, for example. The channel identifying information 32 is used to identify wireless channels or function channels in each mobile transmitting/receiving apparatus 102. The area of the channel identifying information 32 includes an area of wireless channel identifying information 32A and an area of function channel identifying information 32B, as shown in FIG. 2(B). The control information 33 indicates a broadcast (notification) message, a calling message or other messages regarding communication control.

If the control information 33 indicates a broadcast (notification) message, the message includes information specific to the wireless communication system 100 or information indicative of a structure in the control channel used for control among the wireless channels. If the control information 33 indicates a calling message, the message includes, for example, information indicative of a call channel assigned to the mobile transmitting/receiving apparatus 102 by the line control apparatus 101, depending on the fact that the mobile transmitting/receiving apparatus 102 receives the calling from the origin communication terminal. For example, when the mobile transmitting/receiving apparatus 102 in a wait state receives a calling message transmitted on the control channel and destined to the apparatus 102 itself (or its own group), it can start a call with the origin terminal by switching to a call channel indicated in the calling message.

In this embodiment, an idle message differing from a broadcast (notification) message and a calling message is prepared as the control information 33 to be transmitted from the line control apparatus 101 to each mobile transmitting/receiving apparatus 102. An idle message indicates that information transmitted in the area of the control information 33 has no specific meaning for the mobile transmitting/receiving apparatus 102. So, if the control information 33 indicates an idle message, the area of the control information 33 looks as if it is in an unused state to the mobile transmitting/receiving apparatus 102 so that the mobile transmitting/receiving apparatus 102 does not receive the message.

The wireless channel identifying information 32A shown in FIG. 2(B) indicates whether a wireless channel transmitting the wireless channel identifying information 32A is a control channel as a wireless channel for control or a call channel as a wireless channel for call. The function channel identifying information 32B indicates the type of the control information 33 transmitted in the same frame. That is, the function channel identifying information 32B indicates whether information transmitted in the area of the control information 33 next to the area of the channel identifying information 32 is a broadcast (notification) message, a calling message or other messages. If the information transmitted in the area of the control information 33 is an idle message differing from a broadcast (notification) message and a calling message, idle identifying information is transmitted that specifiably indicates that the control information 33 is an idle message in the area of the function channel identifying information 32B.

FIG. 1 also illustrates one configuration example of the mobile transmitting/receiving apparatus 102. The mobile transmitting/receiving apparatus 102 comprises an antenna 51, communication processing part 52, power supply part 53, speech processing part 54, a PTT switch 55 and an operation control part 56.

The antenna 51 is provided to receive an RF signal originated from a wireless base station and originate an RF signal to the wireless base station. The antenna 51 is coupled to the communication processing part 52. The communication processing part 52 comprises a receiving function to demodulate an RF signal received by the antenna 51 into received data and a transmitting function to perform modulation based on transmitted data generated in the speech processing part 54 or the operation control part 56 and transmit an RF signal from the antenna 51.

The power supply part 53, which is configured with power supply source such as a battery and a power supply circuit such as a power voltage stabilization circuit, supplies electric power to components of the mobile transmitting/receiving apparatus 102. An operation of electric power supply from the power supply part 53 to the communication processing part 52 can switch between a supply state in which electric power being supplied and a shutoff state in which electric power supply being stopped, under the control of the operation control part 56.

The speech processing part 54, which is configured with such as a microphone, a speaker, an amplifier circuit, a voice coding/decoding circuit, for example, generates voice data by digitizing voice signals corresponding to voice captured from external sources, or transforms the voice data demodulated in the communication processing part 52 into voice to output it to external destinations.

When a user switches on (for example, pushes) the PTT switch 55, the mobile transmitting/receiving apparatus 102 requests calling to other mobile transmitting/receiving apparatuses 102 or communication terminals from wireless base stations. For example, when the PTT switch 55 is pushed while the mobile transmitting/receiving apparatus 102 is in a wait state, assignment of call channels is requested by transmitting a call request message on a control channel to the wireless base station.

The operation control part 56, which is configured with, for example, an MPU (Micro Processor Unit), is provided to control operations of components in the mobile transmitting/receiving apparatus 102. In this embodiment, the operation control part 56 determines the type, of function channel identifying information transmitted from the wireless base station on the control channel, thereby controlling to make a receiving operation by the communication processing part 52 to be switchable to one of a plurality of types of operations including a reception stop operation during the time period in which the area of the control information 33 reaches the mobile transmitting/receiving apparatus 102. If the part 56 determines that the function channel identifying information is idle identifying information, the operation control part 56 switches a receiving operation by the communication processing part 52 in the area of the control information 33 into the reception stop operation. To switch the communication processing part 52 into the reception stop operation, switching into the shutoff state is also possible to stop electric power supply from the power supply part 53 to the communication processing part 52.

Figure 3:
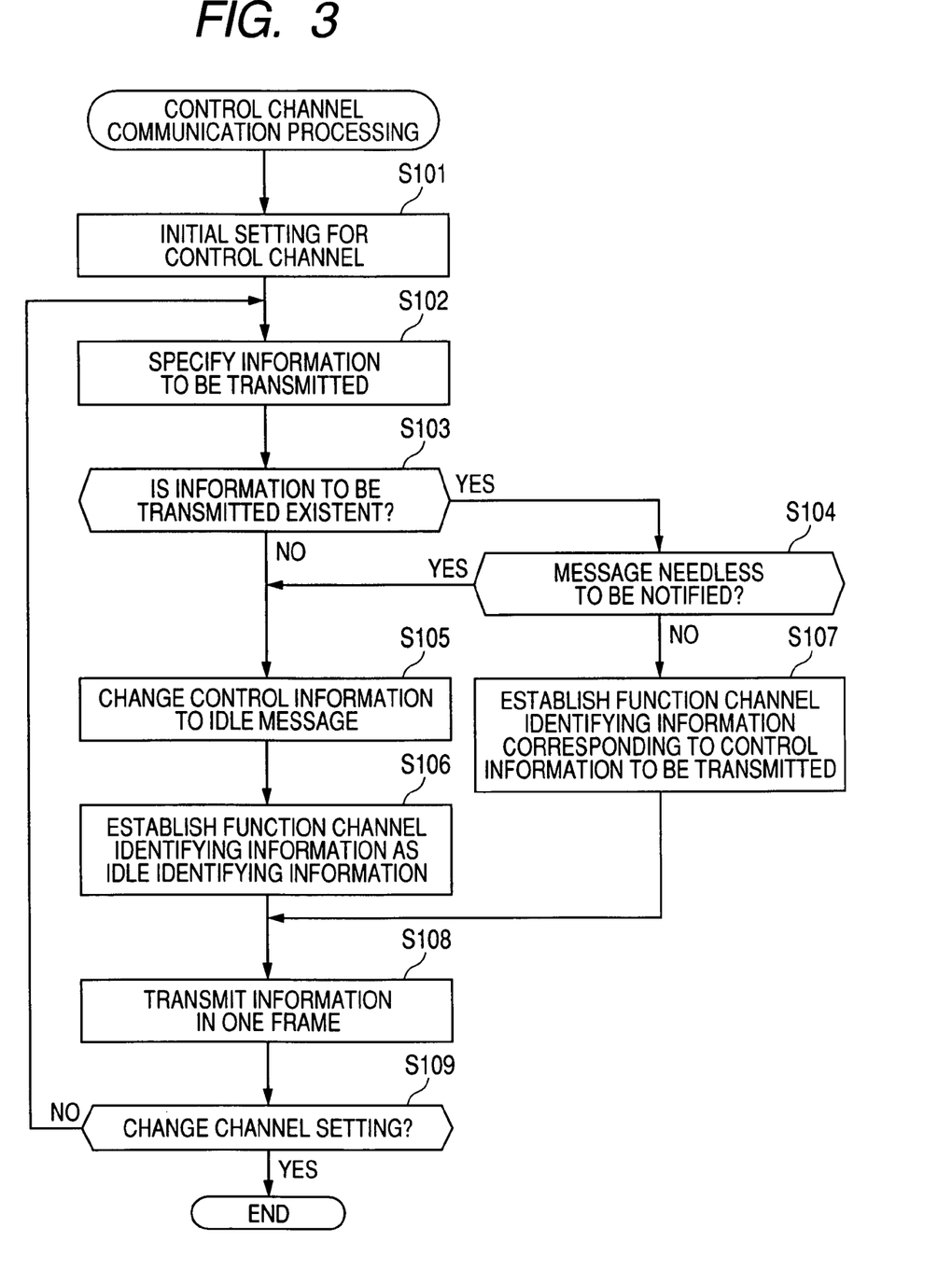
FIG. 3 is a flowchart illustrating one example of control channel communication processing.

The following describes the operation of the line control apparatus 101 and the mobile transmitting/receiving apparatus 102 in the wireless communication system 100 according to embodiments of the present invention. FIG. 3 is a flowchart illustrating one example of control channel communication processing executed in the line control apparatus 101. The control channel communication processing in FIG. 3, which is the processing to transmit various types of information about line control from the line control apparatus 101 to the mobile transmitting/receiving apparatus 102 when the mobile transmitting/receiving apparatus 102 performs wireless communication with the line control apparatus 101 on a control channel, is executed in response to, for example, starting of transmitting/receiving processing on the control channel by the mobile transmitting/receiving apparatus 102.

Upon starting the control channel communication processing in FIG. 3, the line control apparatus 101 first performs initial setting, such as update of channel assignment for example, to use one of wireless channels as a control channel (step S101). At this step, the line control apparatus 101 can, for example, dynamically select and use one of its managing the plurality of wireless channels as the control channel. In this case, the apparatus 101 can reassign the control channel by updating the channel assignment.

After the line control apparatus 101 completes the initial setting to transmit information on the control channel, the apparatus 101 specifies the information (message) to be transmitted, which is incorporated in the area of the control information 33 at the line control apparatus 101, in the information having the frame structure shown in FIGS. 2(A) and (B) (step S102). At this time, the apparatus 101 determines whether information to be transmitted is existent or not (step S103).

If the apparatus 101 determines at step S103 that information to be transmitted is existent (step S103: Yes), it determines whether or not the information to be transmitted is a message which must be notified to the mobile transmitting/receiving apparatus 102 (step S104). At this step, the determination whether or not the information to be transmitted is a message which must be notified to the mobile transmitting/receiving apparatus 102 can be made based on specifications of the wireless communication system 100.

If it is determined at step S103 that no information to be transmitted is existent (step S103: No) or it is determined at step S104 that the information is a message which does not need to be notified (step S104: Yes), the area of the control information 33 is changed to a prepared idle message, since no message is existent which must be notified to the mobile transmitting/receiving apparatus 102 (step S105). At the same time, the apparatus 101 establishes information transmitted in the area of the function channel identifying information 32B in the same frame as idle identifying information (step S106).

If it is determined at step S104 that the information is a message which must be notified to the mobile transmitting/receiving apparatus 102 (step S104: No), the information to be transmitted which was specified at step S102 is established in the area of the control information 33, and information transmitted in the area of the function channel identifying information 32B in the same frame is established in correspondence to contents of the information to be transmitted which was established in the area of the control information 33 (step S107). This enables to specify a frame including the calling message by reading the area of the function channel identifying information 32B at the mobile transmitting/receiving apparatus 102, even if a frame is transmitted without being fixed in which a calling message to be transmitted is established in the area of the control information 33. That is, the mobile transmitting/receiving apparatus 102 can specify the frame including the calling message without reading the area of the control information 33.

When the information is configured to be transmitted in one frame as described above, the line control apparatus 101 transmits the information in one frame to each mobile transmitting/receiving apparatus 102 on the control channel (step S108). Then, the line control apparatus 101 determines whether or not to change the establishment of the control channel (step S109). For example, when it uses a wireless channel used as a control channel as a call channel, or when it reassigns a wireless channel used as a call channel to a control channel, it must change establishment of the control channel.

If it is determined at step S109 to change the establishment of a control channel (step S109: Yes), the control channel communication processing in FIG. 3 is terminated, the execution of the processing is started which has been prepared to change the establishment of the control channel. If it is determined at step S109 not to change the establishment of the control channel (step S109: No), the processing returns to step S102, thereby the processing will be continued to transmit information in the next frame.

Figure 4:
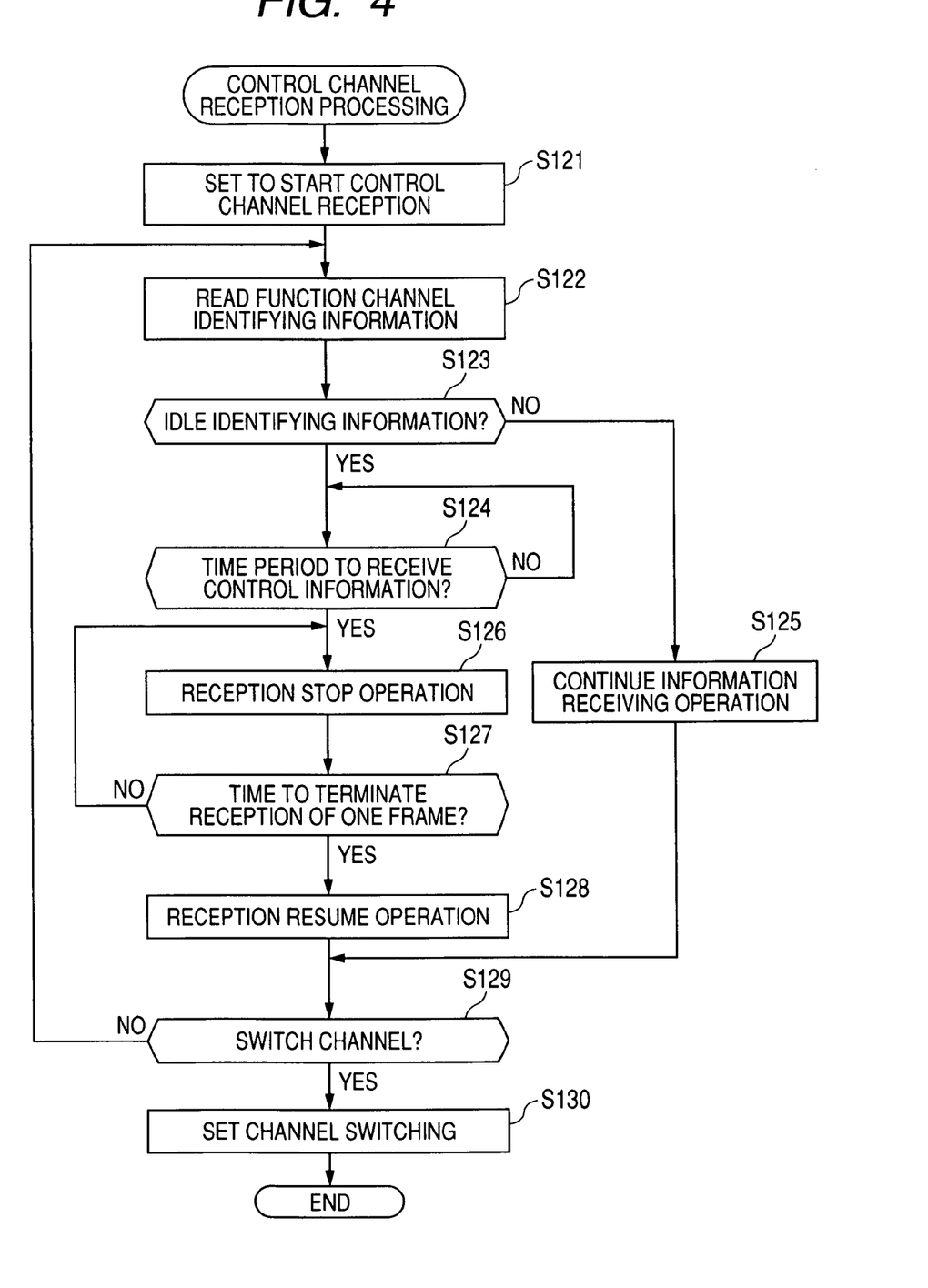
FIG. 4 is a flowchart illustrating one example of control channel reception processing.

FIG. 4 is a flowchart illustrating one example of the control channel receiving processing which the mobile transmitting/receiving apparatus 102 executes to receive the information sent from the line control apparatus 101 on a control channel. After starting the control channel receiving processing in FIG. 4, the mobile transmitting/receiving apparatus 102 first performs initial setting to start the reception of the information sent from the line control apparatus 101 on a control channel (step S121). For example, after switching from a call channel used during a voice call into a control channel under the control by the operation control part 56, or after switching to a control channel reassigned by establishment in the line control apparatus 101, the communication processing part 52 establishes frame synchronization by the synchronizing word 31 received on a control channel and sets information to be receivable which is sent from the line control apparatus 101 on the control channel.

After starting the communication on the control channel, the received data demodulated by the communication processing part 52 is sent to the operation control part 56, and the operation control part 56 reads the function channel identifying information 32B included in the received data (step S122). Then, the read function channel identifying information 32B is determined whether or not to be idle identifying information (step S123).

If it is determined at step S123 that the information 32B is idle identifying information (step S123: Yes), it is further determined whether or not a time period is entered to receive the area of the control information 33 in the information having the frame structure as shown in FIG. 2(A) (step S124). If the area of the function channel identifying information 32B precedes the area of the control information 33, it can be determined that the time period is entered to receive the area of the control information 33 as soon as it is determined at step S123 that the information 32B is idle identifying information. If it is determined at step S123 that the information 32B is not idle identifying information (step S123: No), the receiving operation is continued to receive information transmitted on the control channel (step S125). If it is determined at step S124 that the time period is not entered to receive the area of the control information 33 (step S124: No), processing at step S124 is repeated to wait the time period to receive the area of the control information 33. At this time, for example similarly to the processing at step S125, the receiving operation to receive information transmitted on the control channel can be continued until the time period to receive the area of the control information 33.

If it is determined at step S124 that the time period is entered to receive the area of the control information 33 (step S124: Yes), the operation control part 56 controls to make an operation at the communication processing part 52 a reception stop operation to stop receiving information sent from the line control apparatus 101 on the control channel (step S126).

At this time, the operation control part 56 can put the communication processing part 52 in a reception stop state by shutting off electric power supply from the power supply part 53 to the communication processing part 52.

After the control at step S126 to make the operation the reception stop operation, it is determined whether or not it is a time when the reception of information in one frame terminates such as by determining whether or not it is a time when the end of the area of the control information 33 arrives using for example a pre-determined timer (step S127). At this step, if it is determined that it is before the time for the reception of information in one frame to terminate (step S127: No), the apparatus 102 returns to the processing at step S126 to keep being in the reception stop state.

If it is determined at step S127 that it is a time when reception of information in one frame terminates (step S127: Yes), the operation control part 56 controls an operation at the communication processing part 52 to be a reception resume operation to resume the reception of information sent from the line control apparatus 101 on the control channel (step S128). At this step, the operation control part 56 can resume the receiving operation at the communication processing part 52 by resuming electric power supply from the power supply part 53 to the communication processing part 52.

After the processing at step S125 or step S128 is executed, it is determined whether or not to switch a wireless channel such as switch from a control channel into a call channel or switch to a control channel reassigned by establishment at the line control apparatus 101 (step S129). If it is determined to switch a wireless channel used by the mobile transmitting/receiving apparatus 102 (step S129: Yes), various types of establishment is performed such as by executing the processing prepared to switch the wireless channel (step S130). If it is determined at step S129 not to switch a wireless channel (step S129: No), then the processing will be executed to receive information transmitted in the next frame by returning to the processing at step S122.

Figures 5A, 5B:
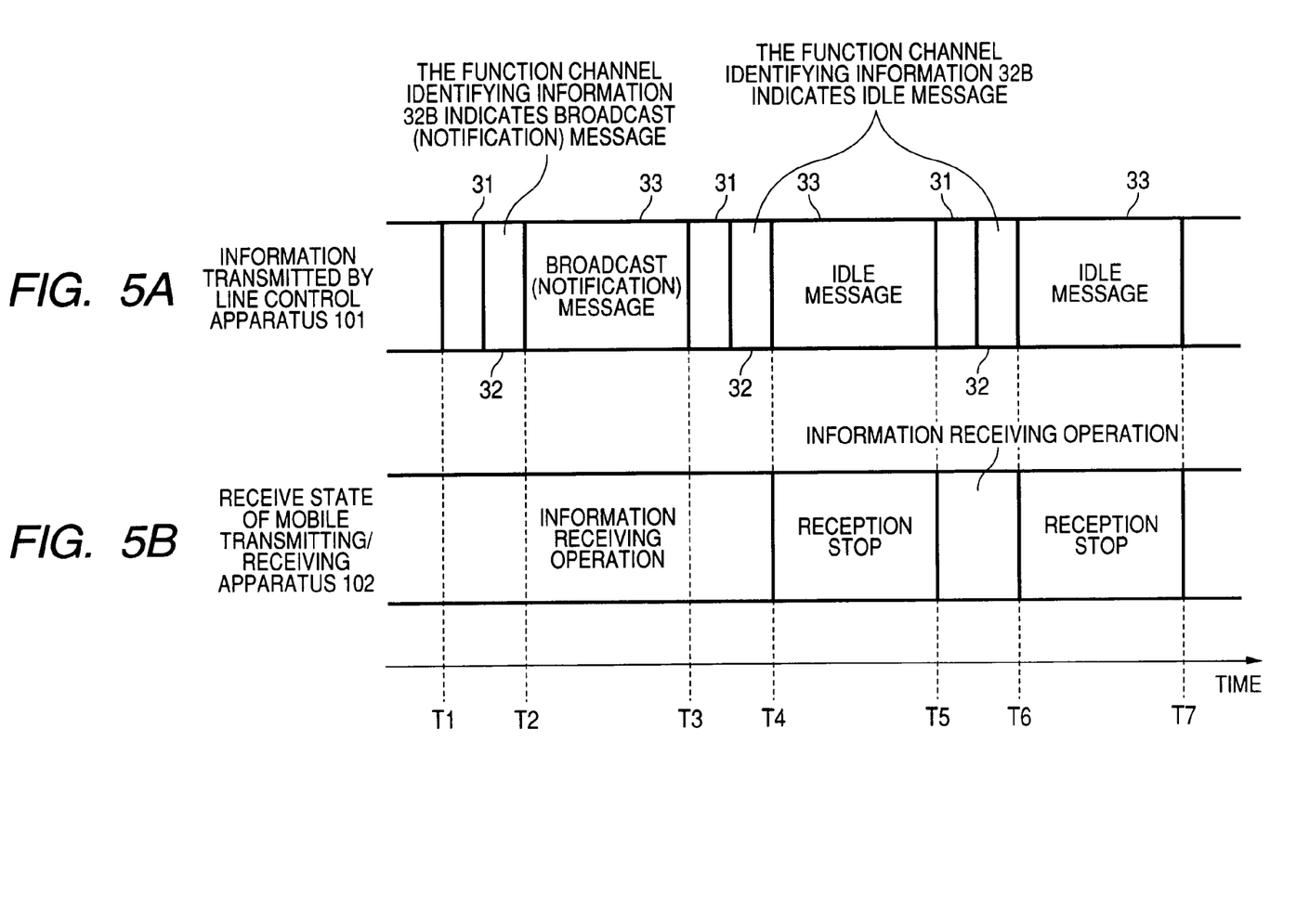
FIG. 5 illustrates one example of an operation in which a mobile transmitting/receiving apparatus receives information sent on a control channel.

Next, with referencing FIGS. 5(A) and (B), one specific example is described about an operation for the line control apparatus 101 to transmit information to the mobile transmitting/receiving apparatus 102 on a control channel, and an operation for the mobile transmitting/receiving apparatus 102 to receive the information sent from the line control apparatus 101 on the control channel. FIG. 5(A) is a timing diagram of an operation for the line control apparatus 101 to transmit information to the mobile transmitting/receiving apparatus 102 on the control channel; and FIG. 5(B) is a timing diagram of an operation for the mobile transmitting/receiving apparatus 102 to receive the information sent from the line control apparatus 101 on the control channel.

For example, as shown in FIG. 5(A), the line control apparatus 101 starts to transmit information included in the first frame at time T1. In the first frame, a broadcast (notification) message that must be notified to the mobile transmitting/receiving apparatus 102 is included in the area of the control information 33. In this case, the function channel identifying information 32B included in the area of the channel identifying information 32 indicates that information transmitted in the area of the control information 33 is a broadcast (notification) message.

At the mobile transmitting/receiving apparatus 102, the operation control part 56 determines, in the processing at step S123 in FIG. 4, that the function channel identifying information 32B included in the first frame, which indicates a broadcast (notification) message, is not idle identifying information (step S123: No). Based on the result of the determination, the processing at step S125 in FIG. 4 is executed, thereby the operation will be continued to receive the information sent on the control channel during a time period after time T2 which is a period to receive the area of the control information 33, as shown in FIG. 5(B).

Then, the line control apparatus 101 starts to transmit information included in the second frame at time T3, as shown in FIG. 5(A). For example in the processing at step S103 in FIG. 3 or the processing at step S104, it is determined that no valid message to be transmitted such as a broadcast (notification) message or a calling message is existent in the second frame (step S103: No, or step S104: Yes). Depending on this determination, at the line control apparatus 101, the area of the control information 33 in the second frame is established as an idle message due to the execution of the processing at step S105 in FIG. 3. Also at this time, due to the execution of the processing at step S106 in FIG. 3, the function channel identifying information 32B included in the same frame is established as idle identifying information for an idle message.

The mobile transmitting/receiving apparatus 102 determines, in the processing at step S123 in FIG. 4, that the function channel identifying information 32B included in the second frame is idle identifying information for an idle message. According to this determination, the operation control part 56 executes the processing at step S126 in FIG. 4 at time T4 determined to be in a time period to receive the area of the control information 33 in the processing at step S124 in FIG. 4, and thereby controls the switching of an operation by the communication processing part 52 into a reception stop operation. Then, the operation control part 56 maintains the communication processing part 52 in a reception stop state by repeatedly executing the processing at step S126 in FIG. 4 until time T5 when a time period to receive the area of the control information 33 ends and the reception of information in one frame terminates. When the time T5 is reached, the part 56 executes the processing at step S128 in FIG. 4, thereby controlling the switching of an operation by the communication processing part 52 into a reception resume operation. In a time-period following the time T5, the communication processing part 52 again executes the receiving operation.

Also at the time T5, the line control apparatus 101 starts to transmit information included in the third frame as shown in FIG. 5(A). It is determined that no message to be transmitted is existent in the third frame, similarly to the second frame in the processing at step S103 in FIG. 3 (step S103: No), or it is determined in the processing at step S104 that the message is a message which does not need to be notified to the mobile transmitting/receiving apparatus 102 (step S104: Yes). In this case, the line control apparatus 101 establishes an idle message in the area of the control information 33 in the third frame, similarly to the transmission of the second frame. The apparatus 101 also establishes the function channel identifying information 32B included in the same frame as idle identifying information.

The mobile transmitting/receiving apparatus 102 determines, in the processing at step S123 in FIG. 4, that the function channel identifying information 32B included in the third frame is idle identifying information. According to this determination, the operation control part 56 controls, similarly to the reception of the second frame, the switching of an operation by the communication processing part 52 at time T6, which is determined to be in a time period to receive the area of the control information 33, into a reception stop operation. Then, the operation control part 56 maintains the communication processing part 52 in a reception stop state until time T7 when the reception of the information included in the third frame terminates. When the time T7 is reached, the operation by the communication processing part 52 switches to the reception resume operation, and the receiving operation will be again executed in time periods following the time T7.

As described above, according to the present invention, information, which has a frame structure and is to be transmitted from the line control apparatus 101 to the mobile transmitting/receiving apparatus 102 through a control channel, includes the area of the function channel identifying information 32B indicative of the type of information transmitted in the area of the control information 33. Based on the function channel identifying information 32B read in the processing at step S122 in FIG. 4, for example if the function channel identifying information 32B is idle identifying information, the mobile transmitting/receiving apparatus 102 switches to the reception stop operation. Otherwise, the apparatus 102 can switch the receiving operation in the area of the control information 33 into one of multiple types of operations including the reception stop operation, such as continues the receiving operation. Using the function channel identifying information 32B, the mobile transmitting/receiving apparatus 102 can detect that a calling message has been sent in any frame. This allows the apparatus 102 to reduce time required to switch from a control channel in response to the assignment of a call channel for a voice call, and to start a call by establishing a communication link with a communication terminal of the called party in a short time.

In the case that a small number of call request messages originate in the mobile transmitting/receiving apparatus 102 to the line control apparatus 101 provided in a wireless base station, the line control apparatus 101 should establish a broadcast (notification) message as a message to be transmitted in the area of the control information 33 in more situations. Meanwhile, even if the mobile transmitting/receiving apparatus 102 continues to receive the same broadcast (notification) message, this will have no special effect in the view of the line control. Therefore, If the line control apparatus 101 determines that no valid message is existent which must be notified to the mobile transmitting/receiving apparatus 102 in the processing at step S103 or S104 in FIG. 3, it establishes an idle message in the area of the control information 33, and establishes the function channel identifying information 32B, which is in the same frame, as idle identifying information. With the determination, if the function channel identifying information 32B is idle identifying information, the mobile transmitting/receiving apparatus 102 switches a receiving operation in the area of the control information 33 into a reception stop operation, thereby enabling its intermittent reception on the control channel and reduction of power consumption accompanying the operation by the communication processing part 52 to elongate the operational time.

The present invention is not limited to the above embodiments, but can be changed and applied in various forms. Although it has been described in the above embodiments that information, which is transmitted from the line control apparatus 101 to the mobile transmitting/receiving apparatus 102 on a control channel, has the frame structure as shown in FIG. 2, the information can also have a different frame structure. As one specific example, the information can have a frame structure including an area of random access control information 35 as shown in FIG. 6.

Figure 6:
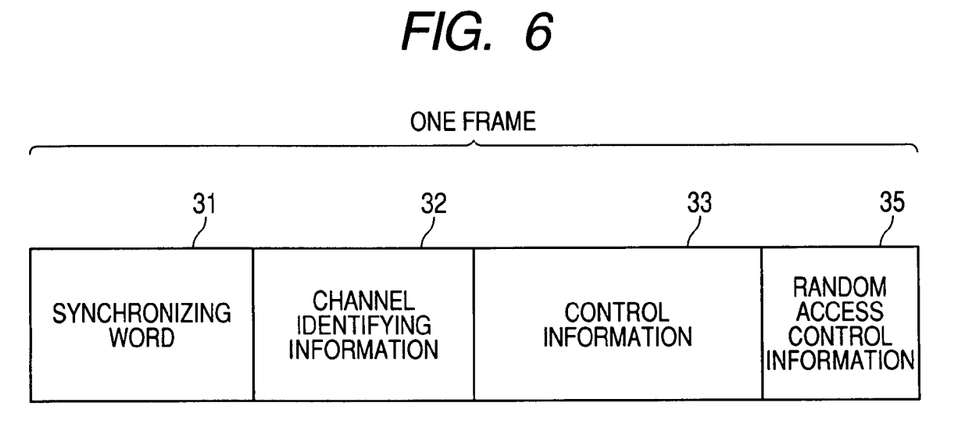
FIG. 6 illustrates a frame structure of, information transmitted by the line control apparatus in an example of a variation of the present invention.

In the example shown in FIG. 6, when the wireless communication system 100 provides random access on the Slotted ALOHA system, in response to a switch-on (for example push) operation on the PTT switch 55 in the mobile transmitting/receiving apparatus 102, soon the mobile transmitting/receiving apparatus 102 sends a call request message to the line control apparatus 101 on a control channel. Then, the line control apparatus 101 must return access control information indicative of permission or prohibition of random access transmission such as by checking availability of wireless channels. At this time, the area of the control information 33 in the information having the frame structure as shown in FIG. 2 is probably established as access control information. However, in this establishment, in order not to make line efficiency of the control channel worse, the number of instances increases in which the area of the control information 33 must be established as information other than an idle message. Therefore, the mobile transmitting/receiving apparatus 102 will less frequently perform intermittent reception.

Consequently, as shown in FIG. 6, the area of the random access control information 35 is separated from the area of the control information 33 and located at the position next to the area of the control information 33. Then, access control information indicative of permission or prohibition of random access transmission can be established in the area of the random access control information 35. This establishment can prevent decrease of the line efficiency of the control channel, but not decreasing the number of situations in which an idle message can be established in the area of the control information 33.

Random access provided by the wireless communication system 100 is not limited to the access on the Slotted ALOHA system, but can be the access on the ICMA-PE (Idle signal Casting Multiple Access-Pertial Echo) system used for example in the ARIB-T61 system. In this case, the line control apparatus 101 can establish busy/idle information indicative of whether a wireless channel is in use (busy) or not in use (idle), collision control information, in which part of uplink information transmitted from each mobile transmitting/receiving apparatus 102 is a partial echo, or the like in the area of the random access control information 35.

When using the frame structure having the area of the random access control information 35 as shown in FIG. 6, processing can be executed with changing the processing shown in the flowchart in FIG. 4 as follows: if the determination in the processing at step S124 in FIG. 4 that it is during a time period to receive the area of the control information 33, the mobile transmitting/receiving apparatus 102 switches to the reception stop operation in the processing at step S126 and then, instead of the processing at step S127, it determines whether or not a time period ends to receive the area of the control information 33 and it is during a time period to receive the area of the random access control information 35. At this time, if it is determined that it is during the time period to receive the area of the random access control information 35, the apparatus can proceed to the processing at step S128 in FIG. 4 to switch to the reception resume operation. Meanwhile, if it is determined that it is not during the time period to receive the area of the random access control information 35, the apparatus 102 can return to the processing at step S126 to keep being in the reception stop state.

Thus, separating the area of the random access control information 35 from the area of the control information 33 and locating it at the position next to the area of the control information 33 increase the number of situations to establish an idle message in the area of the control information 33, also increasing the intermittent reception by the mobile transmitting/receiving apparatus 102 to enable elongating the operational time. Also, quick assignment of a call channel or switch from a control channel in response to random access from the mobile transmitting/receiving apparatus 102 is possible, enabling establishment of a communication link with a communication terminal of the called party in a short time to start a call.

A reserved calling operation can be permitted according to the usage environment of the wireless communication system 100. In this case, similarly to the ARIB-T61 system, control information can be provided with the super frame structure without inconvenience. Therefore, by providing control information having the super frame structure and further the area of the function channel identifying information 32B similarly to the above embodiments, control information can be identified which does not need to be received at the mobile transmitting/receiving apparatus 102. In this case, the mobile transmitting/receiving apparatus 102 switches to a reception stop operation based on the function channel identifying information 32B during a time period to transmit the control information not to be received so that it can perform more efficient intermittent reception.

In the above embodiments, when the line control apparatus 101 establishes an idle message in the area of the control information 33, it establishes information transmitted in the area of the function channel identifying information 32B in the same frame as the idle identifying information. Meanwhile, when the function channel identifying information 32B is idle identifying information, the mobile transmitting/receiving apparatus 102 controls to make a reception stop operation during a time period to receive the area of the control information 33. However, the present invention is not limited to those embodiments, but when a broadcast (notification) message is established in the area of the control information 33, information transmitted in the area of the function channel identifying information 32B can also be established as idle identifying information, for example.

The mobile transmitting/receiving apparatus 102, which serves as a mobile station in a wait state while monitoring a control channel for a wireless base station, does not need to receive broadcast (notification) messages continuously unless contents of a broadcast (notification) message change. If the wireless communication system 100 comprises a plurality of wireless base stations, the mobile transmitting/receiving apparatus 102 serving as a mobile station monitors electric intensity of control channels provided by wireless base stations. The apparatus 102 can switch to a wireless base station with the control channel having the highest electric intensity. In this way, if the system 10 comprises a plurality of wireless base stations, it is generally necessary to know an area of the wireless base station where the mobile transmitting/receiving apparatus 102 serving as a mobile station currently stays. Therefore, when the mobile transmitting/receiving apparatus 102 switches to a new wireless base station, it performs position registration processing. As a condition to perform the position registration processing, the mobile transmitting/receiving apparatus 102 must determine whether the wireless base station is active or not. At this time, the apparatus 102 can determine whether the base station is active or not by reading system information included in a broadcast (notification) message.

As described above, when broadcast (notification) messages are transmitted frequently, the mobile transmitting/receiving apparatus 102, which can switch control channels among a plurality of wireless base stations, can conveniently determine in a short time whether a wireless base station is active or not. However, after the position registration processing terminates and the apparatus 102 enters a wait state on a control channel, if broadcast (notification) messages are transmitted frequently, the intermittent reception by the mobile transmitting/receiving apparatus 102 becomes less frequent.

Therefore, the line control apparatus 101 located on a wireless base station establishes, when defining a broadcast (notification) message which must be received by the mobile transmitting/receiving apparatus 102 as information to be transmitted, information transmitted in the area of the function channel identifying information 32B as identifying information indicative of a broadcast (notification) message. Meanwhile, the apparatus 101 establishes a broadcast (notification) message in the area of the control information 33.

On the other hand, when defining a broadcast (notification) message received voluntarily by the mobile transmitting/receiving apparatus 102 as information to be transmitted, the apparatus 101 establishes the information transmitted in the area of the function channel identifying information 32B as idle identifying information, while it establishes a broadcast (notification) message in the area of the control information 33.

In this case, the mobile transmitting/receiving apparatus 102 can determine whether or not to receive the area of the control information 33 depending on its own operation state, even if the function channel identifying information 32B is idle identifying information. For example, the mobile transmitting/receiving apparatus 102, which is in a wait state on a control channel provided by the same wireless base station, receives the area of the control information 33 if and only if the function channel identifying information 32B is identifying information indicative of a broadcast (notification) message or a calling message, and switches to a reception stop operation during a time period to receive the area of the control information 33 if the function channel identifying information 32B is idle identifying information. On the other hand, the mobile transmitting/receiving apparatus 102 moved from another wireless base station determines that a valid message is included in the area of the control information 33 and receives the message even if the function channel identifying information 32B is idle identifying information. This allows the apparatus 102 to immediately get system information necessary to the position registration processing.

Furthermore, the function channel identifying information 32B can be established as idle identifying information when a message other than a broadcast (notification) message is established in the area of the control information 33 as well as when a broadcast (notification) message is established in the area of the control information 33. Or, a plurality of types of identifying information can be provided as idle identifying information. For example, when the area of the control information 33 is changed to an idle message, and when the area is established as a broadcast (notification) message received voluntarily by the mobile transmitting/receiving apparatus 102, different types of idle identifying information can be established as the function channel identifying information 32B. The mobile transmitting/receiving apparatus 102 switches a receiving operation in the area of the control information 33 depending on the type of idle identifying information established in the function channel identifying information 32B or its own operation state, so that it can perform efficient intermittent reception and smooth control such as quick switching among wireless base stations.

INDUSTRIAL APPLICABILITY

The present invention can provide a land mobile wireless system which can shorten a time period from the time when a PTT switch is pushed till the time when the calling processing completes and a call starts, and a portable mobile wireless terminal which can reduce consumption current as possible as to make battery life longer and elongate the operational time.

The invention claimed is:

1. A wireless communication system for performing wireless communication using a control channel and a plurality of call channels which can be assigned to any one of a plurality of wireless communication apparatuses specified by information transmitted on said control channel, said system comprising:

a channel control apparatus which transmits on a single control channel frame structured information having at least three areas of a synchronizing word, channel identifying information and control information to at least one of said plurality of wireless communication apparatuses, wherein said channel control apparatus is configured to operate to transmit the function channel identifying information indicative of the type of information transmitted in the area of the control information, in the area of the channel identifying information included in said frame structured information and to operate to transmit random access control information indicative of either permission or prohibition of random access transmission, in an area succeeding the area of the control information, and wherein each of said plurality of wireless communication apparatuses is configured to operate to establish a receiving operation in the area of control information as one of a plurality of types of operations including a reception stop operation by determining the type of the function channel identifying information included in said frame structured information when the apparatus receives said frame structured information on the control channel.

2. The wireless communication system according to claim 1, wherein:

said channel control apparatus operates, if the information transmitted in the area of control information is an idle message differing from a broadcast (notification) message and a calling message, to transmit the idle identifying information to specifiably indicate the idle message as the function channel identifying information; and each of said plurality of wireless communication apparatuses operates, if the received function channel identifying information is determined to be the idle identifying information, to switch the receiving operation in the area of control information in the same frame as the function channel identifying information into the reception stop operation.

3. The wireless communication system according to claim 1, wherein:

said channel control apparatus operates to transmit the idle identifying information as the function channel identifying information if the information transmitted in the area of control information is a message that should be received voluntarily by the wireless communication apparatus; and each of said plurality of wireless communication apparatuses operates to establish the receiving operation in the area of control information as either of an operation to continue receiving the information or the reception stop operation depending on an operation state of the apparatus itself if the received function channel identifying information is determined to be the idle identifying information.

4. The wireless communication system according to claim 1, 2 or 3, wherein:

each of said plurality of wireless communication apparatuses operates to switch to a reception resume operation to resume receiving in the area of random access control information when the apparatus switches the receiving operation in the area of control information into the reception stop operation.

5. A wireless communication control apparatus which controls wireless communication using a control channel and a plurality of communication channels which can be assigned to some of a plurality of wireless communication apparatuses specified by information transmitted on said control channel, characterized by:

comprising channel controlling means for transmitting frame structured information, which has at least three areas of a synchronizing word, channel identifying information and control information, to at least one of said plurality of wireless communication apparatuses on the single control channel; and wherein said channel controlling means is configured to operate to transmit function channel identifying information of the type of information transmitted in the area of the control information, in the area of the function channel identifying information included in the channel identifying information of said frame structured information, and to operate to transmit random access control information indicative of either permission or prohibition of random access transmission, in an area succeeding the area of the control information, and wherein said channel control means operates, if the information transmitted in the area of control information is a message that should be received voluntarily by the wireless communication apparatus, to transmit identifying information to indicate whether to receive or not receive the control information as the function channel identifying information.

6. The wireless communication control apparatus according to claim 5, wherein said channel controlling means operates, if the information transmitted in the area of control information is an idle message differing from a broadcast (notification) message and a calling message, to transmit idle identifying information to specifiably indicate the idle message as the function channel identifying information.

7. A wireless communication apparatus for performing wireless communication using a control channel and a communication channel assigned by information transmitted on said control channel, characterized by comprising:

control channel transmission information receiving means for receiving information, which is frame structured information having at least three areas of a synchronizing word, channel identifying information and control information, from a wireless base station on the single control channel, wherein function channel identifying information, which indicates the type of information transmitted in the area of control information, is transmitted in the area of channel identifying information, said control channel transmission information receiving means also receiving random access control information indicative of either permission or prohibition or random access transmission, which is transmitted in an area succeeding the area of the control information; and operation controlling means for establishing a receiving operation in the area of control information as one of multiple types of operations including a reception stop operation by determining the type of function channel identifying information included in said frame structured information received by said control channel transmission information receiving means.

8. The wireless communication apparatus according to claim 7, wherein if the function channel identifying information received by said control channel transmission information receiving means is determined to be idle identifying information to specifiably indicate an idle message differing from a broadcast (notification) message and a calling message as the information transmitted in the area of control information, said operation controlling means switches the receiving operation in the area of control information in the same frame as the function channel identifying information into the reception stop operation.

9. The wireless communication apparatus according to claim 7, wherein said operation controlling means operates:

if the function channel identifying information received by said control channel transmission information receiving means is determined to be identifying information to specifiably indicate a broadcast (notification) message or a calling message as the information transmitted in the area of control information, to establish the receiving operation in the area of control information in the same frame as the function channel identifying information as an operation to continue receiving the information; and if function channel identifying information received by said control channel transmission information receiving means is determined to be the idle identifying information to specifiably indicate an idle message differing from a broadcast (notification) message and a calling message as information transmitted in the area of control information, to establish the receiving operation in the area of control information in the same frame as the function channel identifying information as either of an operation to continue receiving the information or a reception stop operation, depending on an operation state of the apparatus itself.

10. A wireless communication method for performing wireless communication using a control channel and a plurality of communication channels which can be assigned to some of a plurality of wireless communication apparatuses specified by information transmitted on said control channel, said method comprising the steps of:

transmitting frame structured information having at least three areas of a synchronizing word, channel identifying information and control information from a wireless base station to at least one of said plurality of wireless communication apparatuses on the single control channel;

transmitting function channel identifying information indicative of the type of information transmitted in the area of the control information, in the area of the function channel identifying information included in said frame structured information, and transmitting random access control information indicative of either permission or prohibition of random access transmission, in an area succeeding the area of the control information, wherein when each of said plurality of wireless communication apparatuses receives said frame structured information on the control channel, establishing a receiving operation in the area of control information as one of multiple types of operations including a reception stop operation by determining the type of the function channel identifying information included in said frame structured information.

11. The wireless communication method according to claim 10, further comprising the steps of:

if the information transmitted in the area of control information is an idle message differing from a broadcast (notification) message and a calling message, transmitting idle identifying information to specifiably indicate the idle message as the function channel identifying information from said wireless base station; and if each of said plurality of wireless communication apparatuses determines that the received function channel identifying information is the idle identifying information, switching the receiving operation in the area of control information in the same frame as the function channel identifying information into the reception stop operation.

12. The wireless communication method according to claim 10, further comprising the steps of:

if the information transmitted in the area of control information is a message which should be received voluntarily by the wireless communication apparatus, transmitting the idle identifying information as the function channel identifying information from said wireless base station; and if each of said plurality of wireless communication apparatuses determines that the received function channel identifying information is the idle identifying information, establishing the receiving operation in the area of control information as either of an operation to continue receiving the information or the reception stop operation, depending on an operation state of the apparatus itself.

13. The wireless communication method according to claim 10, 11 or 12, further comprising step of:

when each of said plurality of wireless communication apparatuses switches the receiving operation in the area of control information into the reception stop operation, switching a reception resume operation to resume receiving in the area of random access control information.

* * * * *